United States Patent
Tamada et al.

(10) Patent No.: US 7,111,713 B2
(45) Date of Patent: Sep. 26, 2006

(54) IMPACT ABSORBING MEMBER FOR VEHICLE

(75) Inventors: Teruo Tamada, Yokohama (JP); Hiroo Inui, Nagoya (JP); Kiyotaka Urakawa, Katano (JP); Kenji Ishii, Nagoya (JP); Tadatoshi Tanji, Fujisawa (JP)

(73) Assignee: Kyoraku Co., Ltd., Tokyo (JP)

( * ) Notice: Subject to any disclaimer, the term of this patent is extended or adjusted under 35 U.S.C. 154(b) by 0 days.

(21) Appl. No.: 10/698,706

(22) Filed: Oct. 31, 2003

(65) Prior Publication Data

US 2004/0195064 A1    Oct. 7, 2004

(30) Foreign Application Priority Data

| Oct. 31, 2002 | (JP) | ............................. 2002-319160 |
| Oct. 31, 2002 | (JP) | ............................. 2002-319161 |
| Oct. 31, 2002 | (JP) | ............................. 2002-319162 |
| Oct. 31, 2002 | (JP) | ............................. 2002-319163 |
| Jan. 31, 2003 | (JP) | ............................. 2003-025254 |
| Jan. 31, 2003 | (JP) | ............................. 2003-025255 |
| Jan. 31, 2003 | (JP) | ............................. 2003-025256 |
| Jan. 31, 2003 | (JP) | ............................. 2003-025257 |
| Jan. 31, 2003 | (JP) | ............................. 2003-025258 |
| Feb. 28, 2003 | (JP) | ............................. 2003-054856 |
| Feb. 28, 2003 | (JP) | ............................. 2003-054857 |
| Feb. 28, 2003 | (JP) | ............................. 2003-054858 |
| Mar. 31, 2003 | (JP) | ............................. 2003-097349 |
| May 14, 2003  | (JP) | ............................. 2003-135249 |

(51) Int. Cl.
*F16F 7/12* (2006.01)

(52) U.S. Cl. ...................................... 188/371; 267/136
(58) Field of Classification Search ................ 188/371; 267/136

See application file for complete search history.

(56) References Cited

U.S. PATENT DOCUMENTS

| 2,434,641 | A | * | 1/1948 | Burns .......................... 267/117 |
| 4,670,324 | A | * | 6/1987 | Sato et al. ................... 428/178 |

(Continued)

FOREIGN PATENT DOCUMENTS

JP           10-250513           9/1998

(Continued)

*Primary Examiner*—Robert A. Siconolfi
(74) *Attorney, Agent, or Firm*—Maine & Asmus

(57) ABSTRACT

A system is disclosed for the absorption of an impact, that system comprises a blow molded thermoplastic energy absorbing member. The blow molded thermoplastic energy absorbing member provides opposing first and second walls defining a hollow space; according to one embodiment, a plurality of fused and unfused recessed ribs integrally molded between the first and second walls. The fused recessed ribs have a fused recessed rib end. The fused recessed rib ends are integrally fused to either opposite recessed rib ends or the facing opposite wall at a welded surface such that the height of the recessed ribs from the first wall to the welded surface is about approximately 15.0 to 45.0 mm. The recessed ribs are, according to one embodiment, connected by a plurality of straight interlocking ribs.

8 Claims, 12 Drawing Sheets

U.S. PATENT DOCUMENTS

| | | | | |
|---|---|---|---|---|
| 4,895,352 A | * | 1/1990 | Stumpf | 267/80 |
| 4,951,986 A | * | 8/1990 | Hanafusa et al. | 293/120 |
| 5,979,078 A | * | 11/1999 | McLaughlin | 36/29 |
| 6,000,738 A | * | 12/1999 | Stewart et al. | 293/102 |
| 6,086,145 A | * | 7/2000 | Wandyez | 296/214 |
| 6,120,090 A | * | 9/2000 | Van Ert et al. | 296/211 |
| 6,247,745 B1 | * | 6/2001 | Carroll et al. | 188/371 |
| 6,385,864 B1 | * | 5/2002 | Sell et al. | 36/29 |
| 6,406,079 B1 | * | 6/2002 | Tamada et al. | 293/120 |
| 6,550,850 B1 | * | 4/2003 | Laborie et al. | 296/146.6 |
| 6,551,450 B1 | * | 4/2003 | Thomas et al. | 156/580.1 |
| 2004/0124572 A1 | * | 7/2004 | Tamada et al. | 267/136 |

FOREIGN PATENT DOCUMENTS

| | | |
|---|---|---|
| JP | 2002187508 | 7/2002 |
| JP | 2002201322 | 7/2002 |

\* cited by examiner

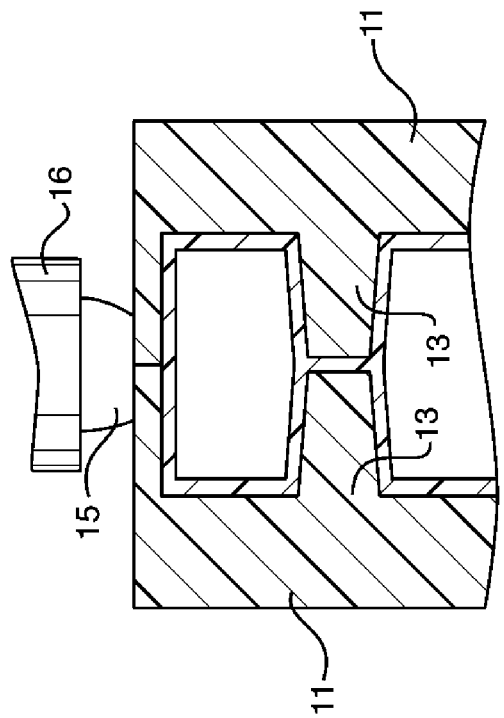
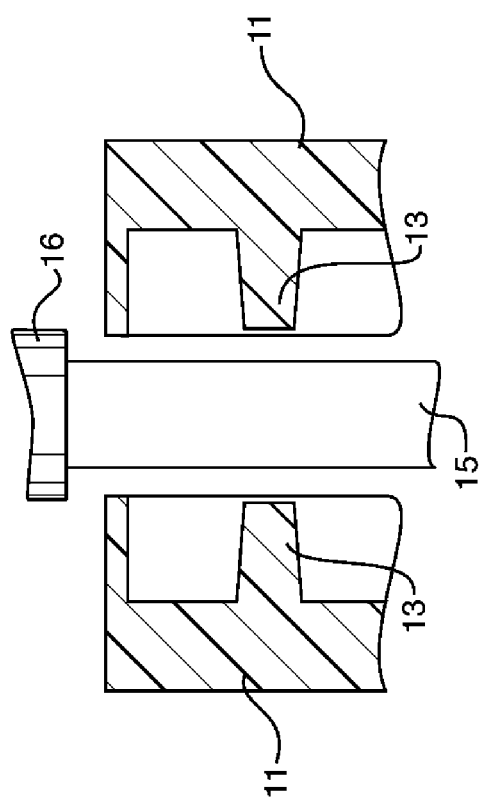

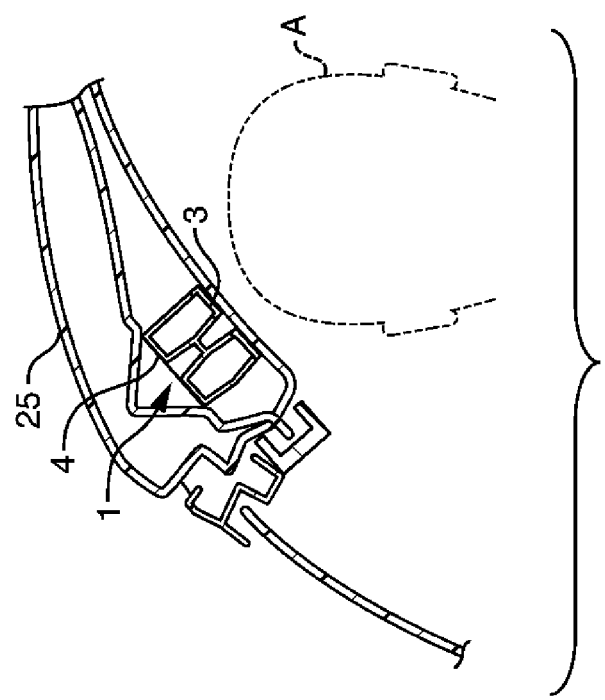
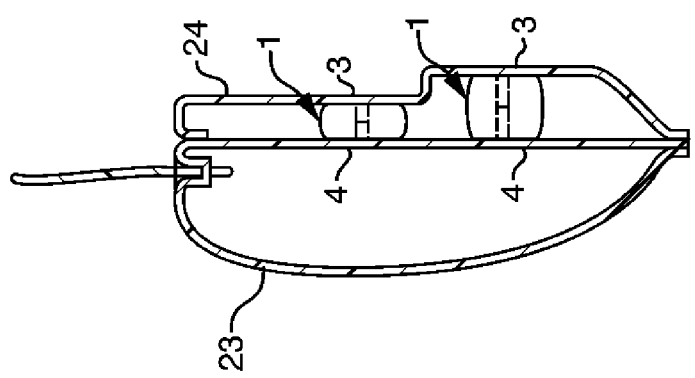

IMPACT ABSORBING MEMBER FOR VEHICLE

RELATED APPLICATIONS

This application claims the priority to Japanese Application Number 2002-319160 filed on Oct. 31, 2002, Japanese Application Number 2002-319161 filed on Oct. 31, 2002, Japanese Application Number 2002-319162 filed on Oct. 31, 2002, Japanese Application Number 2002-319163 filed on Oct. 31, 2002, Japanese Application Number 2003-025254 filed on Jan. 31, 2003, Japanese Application Number 2003-025255 filed on Jan. 31, 2003, Japanese Application Number 2003-025256 filed on Jan. 31, 2003, Japanese Application Number 2003-025257 filed on Jan. 31, 2003, Japanese Application Number 2003-025258 filed on Jan. 31, 2003, Japanese Application Number 2003-054856 filed on Feb. 28, 2003, Japanese Application Number 2003-054857 filed on Feb. 28, 2003, Japanese Application Number 2003-054858 filed on Feb 28, 2003, Japanese Application Number 2003-097349 filed on Mar. 31, 2003, and Japanese Application Number 2003-135249 filed on May 14, 2003.

FIELD OF THE INVENTION

The present invention relates to a member for absorbing an impact or the energy therefrom, provided inside a vehicle structural member such as a door, a door trim, a body side panel, a roof panel, a pillar, and a bumper, for absorbing the impact from the inside such as the collision of a passenger against the inner wall of the vehicle structural member or the impact from the outside such as the collision with another vehicle.

BACKGROUND OF THE INVENTION

The safety of occupants of automobiles during a collision can improve with the installation of impact absorbing components such components and members absorb the energy of the impact and may alternatively be referred to as energy absorbing components or members in the structure of the automobile. The official gazette of Japanese Patent No. 3,313,999 discloses an energy absorbing component with a hollow double wall structure, produced by blow molding of thermoplastics, forming recessed ribs from the front surface wall and the rear surface wall with the top end parts thereof bonded with each other so as to be integrated for improving the energy absorbing property, and the official gazette of Japanese Patent Application Laid Open (JP-A) No. 2002-187508 discloses one comprising an interlocking rib for integrally linking a plurality of recessed ribs for improving the energy absorbing property.

This kind of energy absorbing member is designed to be provided inside a vehicle structural member such as a door and a body side panel. It has been found that a sufficient shock absorbing property is not obtained by merely linking a plurality of the recessed ribs integrally as shown in the official gazette of Japanese Patent Application Laid Open (JP-A) No. 2002-187508.

Moreover, according to the energy absorbing member for a vehicle as disclosed in the official gazette of Japanese Patent No. 3,313,999 produced by forming recessed ribs from the front surface wall and the rear surface wall with the top end parts thereof bonded with each other so as to be integrated, it is pointed out that although the shock absorbing property with respect to the stress by the impact is high, in the case the stress by the impact is applied continuously, the recessed ribs buckle so that the energy absorbing property is deteriorated remarkably so that the intended shock absorbing property is not obtained.

Furthermore, since the welded surface produced by forming recessed ribs from the front surface wall and the rear surface wall and welding the top end parts with each other in the blow molding process is formed by pressuring a parison in a molten state by a mold, the resin in the molten state is pushed out to the outer circumference of the bonding part so as to generate a puddle as shown in FIG. 11. The marks a', b' denote recessed ribs, c' a bonding part, and d' a resin puddle swelling to the outside of the bonding part c'. Thereby, a notch part is formed or the wall thickness of the recessed rib becomes uneven so that the shock absorbing performance of the energy absorbing member is lowered, and thus a desired shock absorbing effect cannot be obtained.

Accordingly, it is desirable to provide an energy absorbing member for a vehicle made of thermoplastics, capable of providing excellent shock absorbing property, and being formed integrally by blow molding.

BRIEF SUMMARY OF THE INVENTION

One embodiment of the present invention provides a system for absorbing an impact, that system comprising: a blow molded thermoplastic energy absorbing member comprising; opposing first and second walls defining a hollow space; a plurality of fused pairs of recessed ribs, each fused pair comprising first and second recessed ribs; the first recessed rib is integrally molded from the first wall and having a first recessed rib end; the second recessed rib is integrally molded from the second wall and having a second recessed rib end; the first and second recessed ribs being integrally fused at a welded surface disposed between the first and second recessed rib ends; an average distance from the first wall to the welded surface is about approximately 15.0 to 45.0 mm; an average distance from the second wall to the welded surface is about approximately 15.0 to 45.0 mm; and the hollow space having a height between the first wall and the second wall of about approximately 30.0 to 90.0 mm.

Another embodiment of the present invention provides such a system further comprising an interlocking rib disposed on the first wall, integrally coupled to at least two of the first recessed ribs.

A further embodiment of the present invention provides such a system further comprising an interlocking rib disposed on the second wall, integrally coupled to at least two of the second recessed ribs.

Still another embodiment of the present invention provides such a system further comprising a first interlocking rib disposed on the first wall, integrally coupled to at least two of the first recessed ribs and a second interlocking rib disposed on the second wall, integrally coupled to at least two of the second recessed ribs.

Even another embodiment of the present invention provides such a system wherein the interlocking rib has a depth of 'b' mm wherein $3.0 \leq b \leq \sqrt{(a/0.5)}$ where 'a' is the average distance in millimeters between the first and second walls.

An even further embodiment of the present invention provides such a system wherein the recessed ribs are disposed on a plurality of virtual straight lines 'c', the lines 'c' being oriented at an angle of about approximately 30 to 60° from line 'd', the line 'd' being a line along a row of the fused pairs of recessed ribs, the interlocking ribs being formed along at least one line 'c'.

Yet another embodiment of the present invention provides such a system wherein the interlocking ribs are formed such that a total length of all the interlocking ribs is in a range of 10 to 60% with respect to a total length of all the lines 'c'.

A yet further embodiment of the present invention provides such a system wherein the interlocking ribs are a recessed groove.

Even still another embodiment of the present invention provides such a system further comprising a swelling part disposed in the first recessed rib end.

An even still further embodiment of the present invention provides such a system wherein the swelling part is formed in a hollow shape.

A still yet another embodiment of the present invention provides such a system further comprising a stepwise part projecting from the welded surface.

A still yet further embodiment of the present invention provides such a system further comprising at least one unfused pair of recessed ribs having an interval disposed between said first and second recessed rib ends.

Another embodiment of the present invention provides such a system wherein fused pairs of recessed ribs comprise 50 to 80% of a total number of a sum of the fused and unfused pairs of recessed ribs.

A further embodiment of the present invention provides such a system wherein the first unfused recessed rib end has a surface chosen from the group of surfaces consisting of a concave surface and a convex surface and the second unfused recessed rib end has a surface of the group not chosen by the first recessed rib.

Yet another embodiment of the present invention provides a system for the absorption of an impact, that system comprising: a blow molded thermoplastic energy absorbing member comprising; opposing first and second walls defining a hollow space; a plurality of recessed ribs integrally molded from the first wall and extending toward the second wall; the recessed ribs comprising a fused recessed rib end; the fused recessed rib ends being integrally fused to the second wall at a welded surface; and wherein a height of the recessed ribs from the first wall to the welded surface is about approximately 15.0 to 45.0 mm.

A yet further embodiment of the present invention provides such a system further comprising an interlocking rib formed in the first wall, integrally linking at least two adjacent fused recessed ribs.

Still another embodiment of the present invention provides such a system wherein the recessed ribs are disposed on at least one virtual straight line, the interlocking ribs being formed along at least one line 'c', line 'c' being oriented at an angle of about approximately 30 to 60° from line 'd', line 'd' being a line along a row of the fused pairs of recessed ribs.

A still further embodiment of the present invention provides such a system further comprising a swelling part disposed in a welded surface.

Still yet another embodiment of the present invention provides such a system further comprising at least one unfused recessed rib comprising an unfused recessed rib end; and an interval disposed between the unfused recessed rib end and the second wall.

A still yet further embodiment of the present invention provides such a system wherein the fused recessed ribs comprise 50 to 80% of a total number comprising the sum of the fused and unfused recessed ribs.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 15 is a view showing a first step for molding an energy absorbing member for a vehicle according to the invention by blow molding.

FIG. 16 is a view showing a second step for molding an energy absorbing member for a vehicle according to the invention by blow molding.

FIG. 19 is a cross-sectional view showing an embodiment with an energy absorbing member for a vehicle according to the invention provided inside a door trim of a vehicle.

FIG. 20 is a cross-sectional view showing an embodiment with an energy absorbing member for a vehicle according to the invention provided inside a rear pillar of a vehicle.

DETAILED DESCRIPTION OF THE INVENTION

Figure 1:
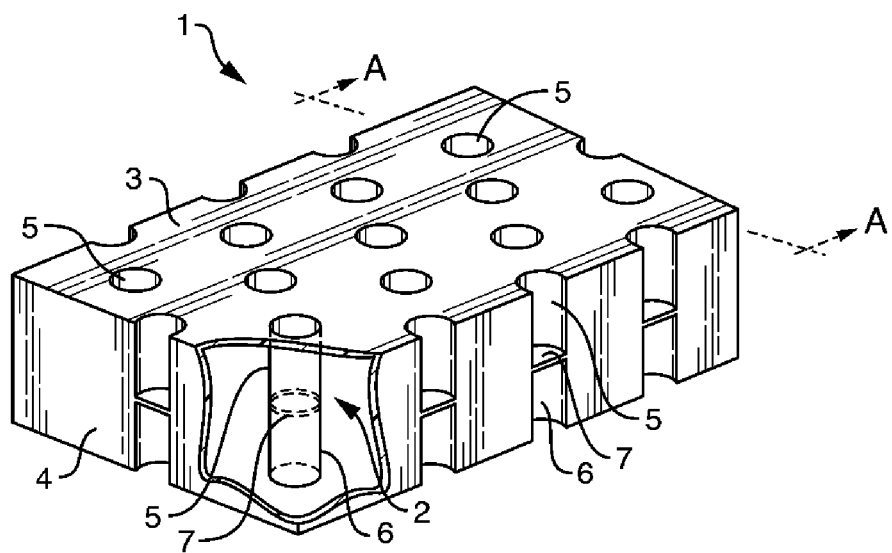
FIG. 1 is a partially broken perspective view showing an energy absorbing member for a vehicle according to an embodiment of the present invention.
Figure 2:
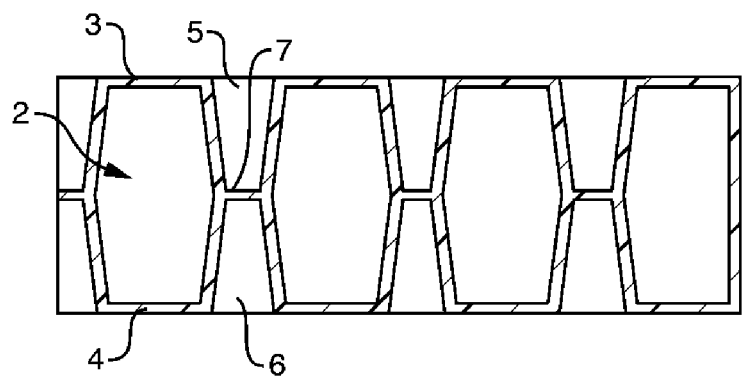
FIG. 2 is an enlarged cross-sectional view taken on the line A—A of FIG. 1.
Figure 3:
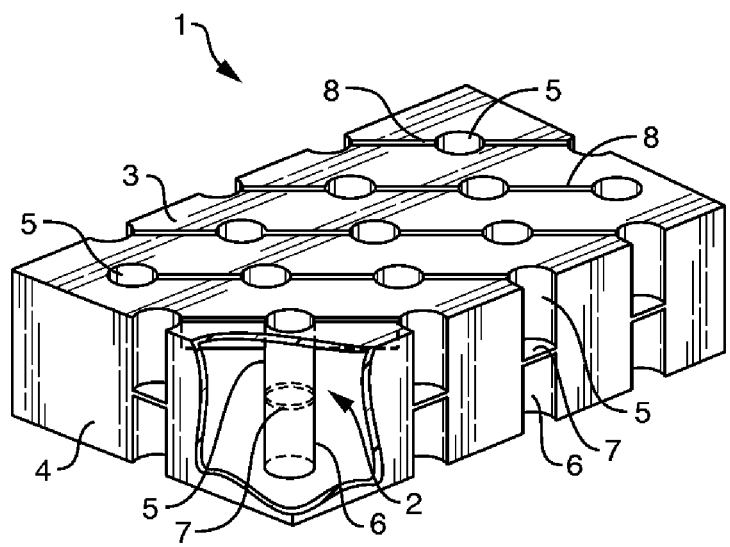
FIG. 3 is a partially broken perspective view showing an energy absorbing member for a vehicle according to another embodiment of the invention.

Referring to FIGS. 1 and 2, the reference numeral 1 denotes an energy absorbing member for a vehicle configured according to one embodiment of the present invention. The energy absorbing member for a vehicle 1 is comprised of a thermoplastic resin. It is molded integrally by blow molding, and comprises a hollow part 2, and a plurality of recessed ribs 5, 6 formed by denting both a first wall 3 and a second wall 4 facing with each other, with the top end parts of the first and the second ribs 5, 6 contacted with each other so as to provide a welded surface 7. The recessed ribs 5, 6, according to one embodiment, are formed like either circular conic or oval conic or polygonal pyramid by denting, depressing or otherwise molded from the first wall 3 and the second wall 4 respectively and they have hole openings with a diameter or diagonal in the range of 15.0 to 30.0 mm and a welded surface 7 with a diameter or diagonal in the range of 5.0 to 15.0 mm.

It should be noted that the term "recessed rib" refers to ribs, columns or other such structure, which from the exterior of the component appear to be a recess. One skilled in the art would readily appreciate that other rib designs formed by blow molding would be equivalent, such designs include but are not limited to hollow ribs, ribs having closed ends, solid ribs, and ribs with ends flush with the external surface of the first and second walls.

The height from the first wall 3 to the welded surface 7 of the first recessed ribs 5 is formed to 15.0 to 45.0 mm, and the height from the second wall 4 to the welded surface 7 of the second recessed ribs 6 is formed to 15.0 to 45.0 mm. By forming the height of the first recessed ribs 5 and the second recessed ribs 6 in a range of 15.0 to 45.0 mm, the impact at the time of the collision can be absorbed sufficiently in the process of crushing the recessed ribs so that a preferable energy absorbing member for a vehicle can be produced. The average distance between the first wall 3 and the second wall 4 of the energy absorbing member for a vehicle 1 is 30.0 to 90.0 mm, and the average wall thickness is 0.5 to 5.0 mm.

In another embodiment of the invention shown in FIGS. 3 to 6, the energy absorbing member for a vehicle 1 comprises an interlocking rib 8 for integrally linking a plurality of adjacent recessed ribs 5.

Figure 4:
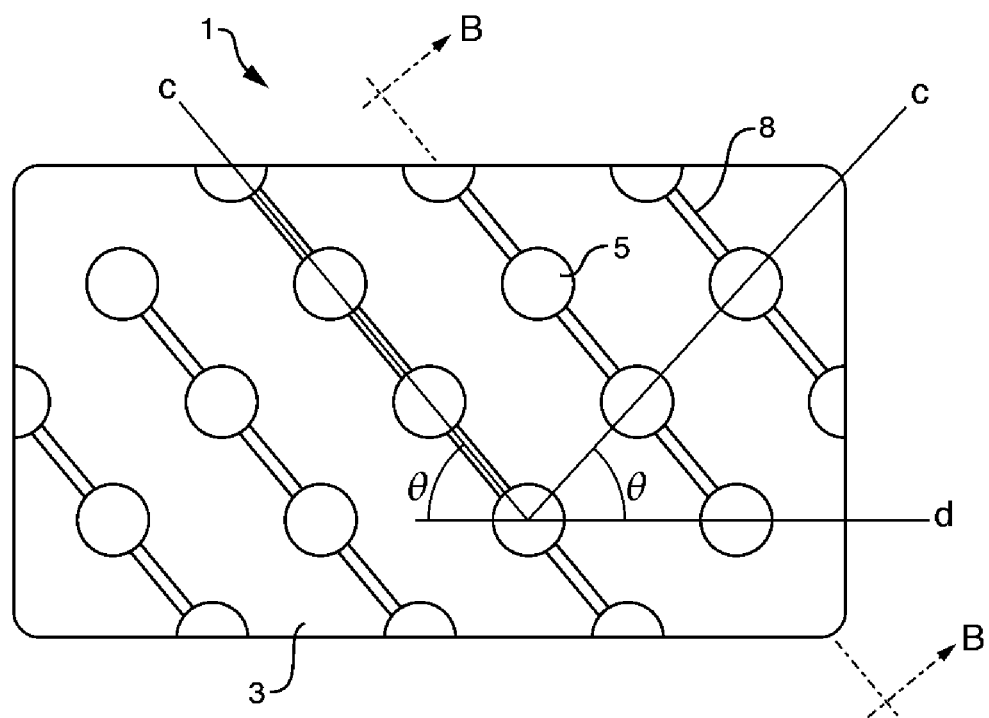
FIG. 4 is a plan view of FIG. 3.

As shown in FIG. 4, the interlocking ribs 8 are formed on virtual straight lines c. The virtual straight lines are positioned with the angle θ formed with respect to the horizontal line d in a range of 30 to 60°.

Figure 5:
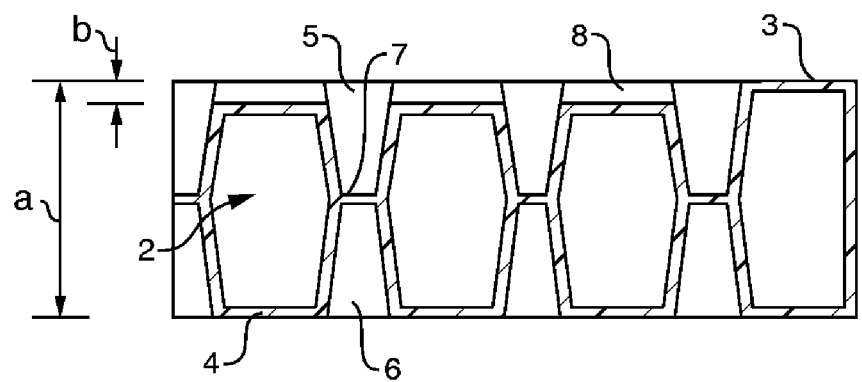
FIG. 5 is an enlarged cross-sectional view taken on the line B—B of FIG. 4.

As shown in FIG. 5, the depth of interlocking ribs 8 is formed in a range of $3.0 \leq b \leq \sqrt{(a/0.5)}$ where "a" is the thickness (mm) of the energy absorbing member 1, and "b" is the depth (mm) of the interlocking ribs. The width of the interlocking ribs is typically between 2.0 to 5.0 mm.

Furthermore, the interlocking ribs 8 are formed such that the total length of all the interlocking ribs is in a range of 10 to 60% with respect to the total length of all the segments of virtual lines on both walls from edge to edge. According to one embodiment, they are formed only in one of the two walls 3, 4, with the ratio of 25%.

Figure 6:
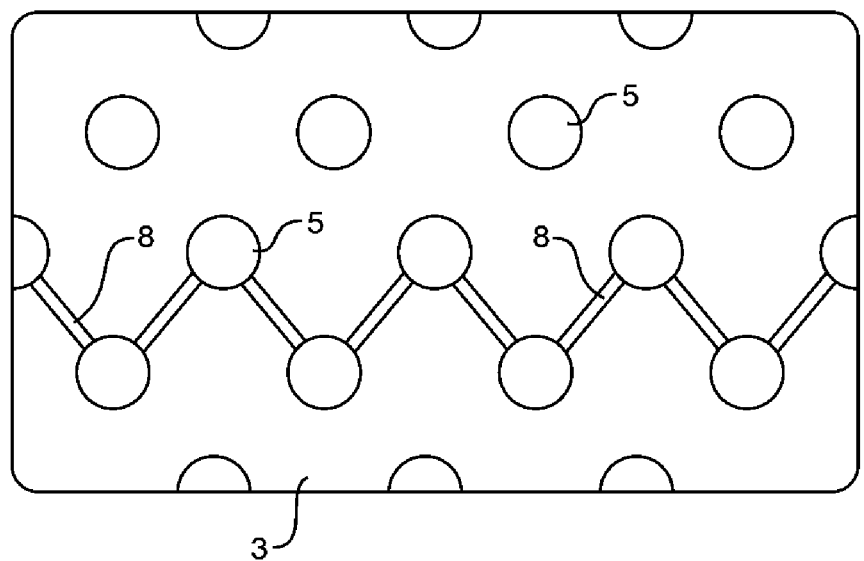
FIG. 6 is a plan view showing another embodiment of the invention corresponding to FIG. 4.

According to one embodiment, illustrated in FIG. 4, interlocking ribs 8 are disposed in the first wall 3. These ribs connect recessed ribs 5. The recessed ribs 5 are arranged in an array such that the interlocking ribs 8 are disposed along either line "c". Lines "c" are at an angle θ from each line of recessed ribs 5, arranged along line "d". Angle θ generally is between 30 and 60°. In this way, straight lines of recessed ribs 5 are connected by interlocking ribs 8. One of ordinary skill in the art will readily appreciate that embodiments wherein angle θ is less than 30° or greater than 60° would be within the scope of the present invention. Likewise other configurations of interlocking ribs 8 according to various embodiments can be provided, as illustrated in FIG. 6 where the interlocking ribs alternate between lines "c". In other embodiments, the interlocking ribs 8 can be disposed along line "d" or along lines perpendicular to line "d", or some combination of the lines "c" and "d". Other embodiments may exist where interlocking ribs are disposed on both first and second walls. In such embodiments, different configurations of interlocking ribs may be disposed on the first and second walls.

In the case where the depth b of the interlocking ribs 8 is less than 3 mm, the strength needed for constantly maintaining the posture of the recessed ribs 5 is inadequate in the event of an impact, and would result in "toppling", "caving in", or crushing of the recessed rib 5. In contrast, where the depth b of the interlocking ribs 8 is larger than the value of the square root of two times the thickness of the energy absorbing member for a vehicle 1, the interlocking ribs 8 are contacted with the facing wall before providing full performance in the process of crushing the recessed ribs 5, 6 at the time of collision so that the desired energy absorbing performance cannot be obtained.

Figure 7:
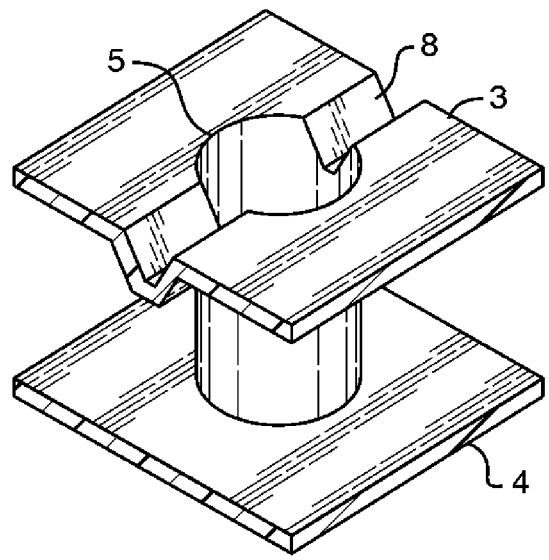
FIG. 7 is an enlarged cross-sectional view showing the essential part of the energy absorbing member for a vehicle according to the invention of FIG. 3.
Figure 8:
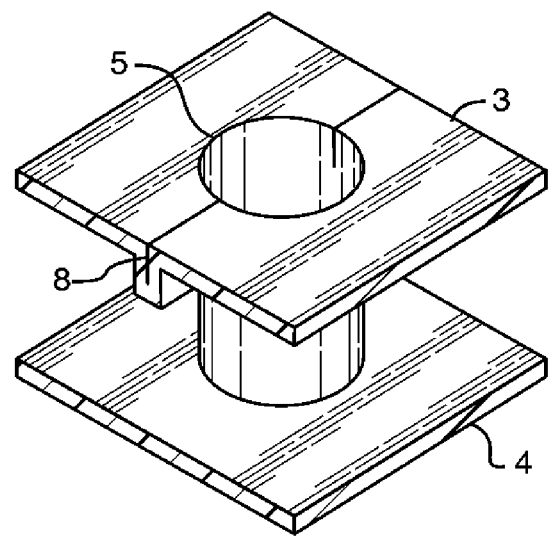
FIG. 8 is a view showing another embodiment of the invention corresponding to FIG. 7.

FIGS. 7 and 8 illustrate two embodiments of the present invention providing interlocking ribs 8 connecting recessed ribs 5. The interlocking rib 8 of the embodiment illustrated in FIG. 7 is open. The embodiment of FIG. 8 provides a rib 8 that is closed. The closed rib of FIG. 8 is formed by withdrawing a sliding mold core for deforming the first wall 3 so as to form an open interlocking rib similar to the interlocking rib 8 of FIG. 7 during the blow molding process and pressurizing the hollow space 2 within the mold, thereby compressing the sides of the open rib, so that the sides of the rib are welded or otherwise integrally fused.

Figure 10:
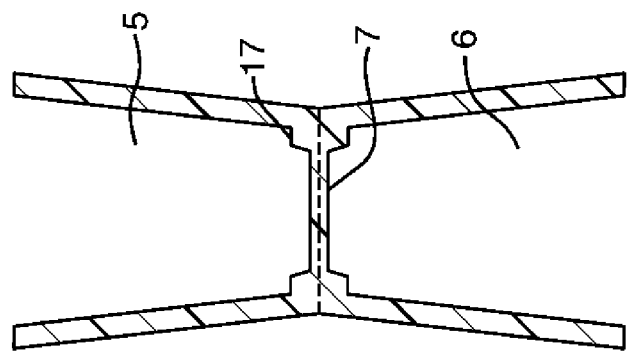
FIG. 10 is a view showing another embodiment of the invention corresponding to FIG. 9.
Figure 9:
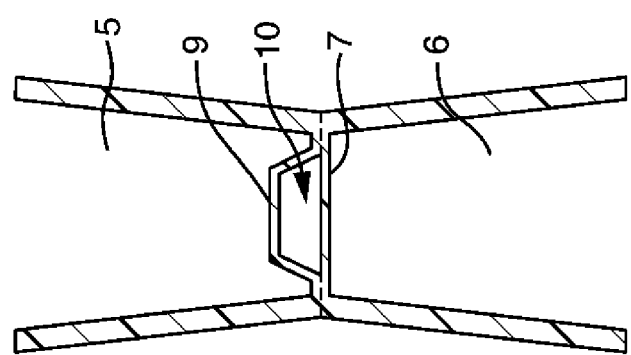
FIG. 9 is an enlarged cross-sectional view showing the essential part of an energy absorbing member for a vehicle according to the invention.
Figure 11:
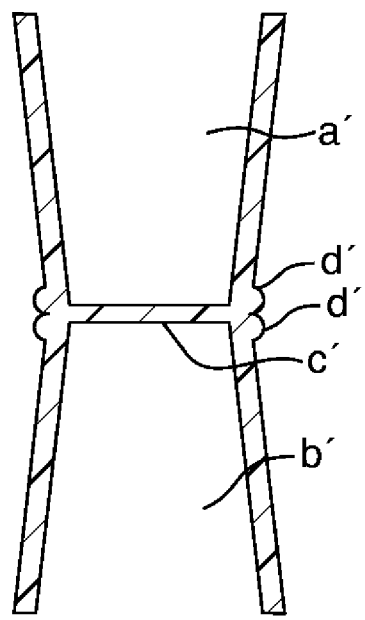
FIG. 11 is a view showing a conventional embodiment corresponding to FIG. 9.

A cross-sectional enlarged view of a pair of the recessed ribs is shown in FIGS. 9 to 11. On the welded surface 7 with the top end parts of the first recessed rib 5 and the second recessed rib 6 welded and integrated, a swelling part 9 is formed integrally, with a hollow part 10 formed in the swelling part 9. Swelling part 9 refers to region of the weld surface 7 wherein is disposed a hollow part 10. The swelling part 9 can be thicker than the other walls of the rib, or can be merely a formation in the weld surface 7. This hollow part 10 is a depression, cavity or formation at the weld surface where excess thermoplastic can accumulate rather than be expelled from the side of the rib by the pressure of the mold.

The swelling part 9 formed on the welded surface 7 of the first and second recessed ribs 5, 6 may be formed in a step wise fashion 17 with both end parts of the welded surface 7 projecting as shown in FIG. 10.

Figure 18:
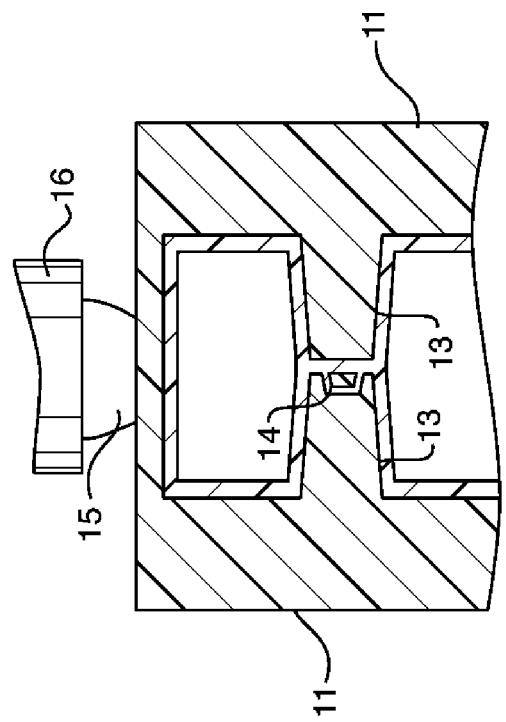
FIG. 18 is a view showing a second step for molding an energy absorbing member for a vehicle according to another embodiment of the invention by blow molding.
Figure 17:
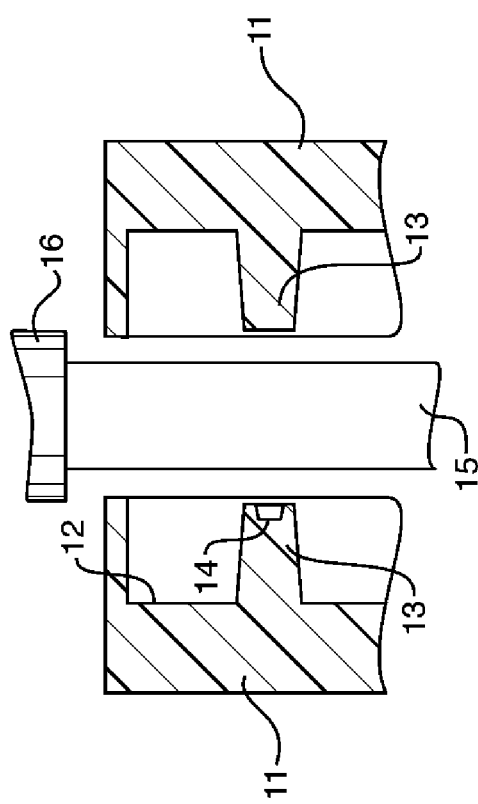
FIG. 17 is a view showing a first step for molding an energy absorbing member for a vehicle according to another embodiment of the invention by blow molding.

FIGS. 17 and 18 show a blow molding steps for forming the swelling part 9. In FIGS. 17 and 18, the reference numerals 11, 11 denote a pair of split mold halves, 12, 12 denote cavities, and 13, 13 denote recessed rib forming parts. One of the recessed rib forming parts, 13, 13 has a swelling part forming member 14. The reference numeral 15 denotes a parison, and 16 an extrusion head.

As shown in FIG. 17, by disposing the parison 15 between the pair of the split mold halves 11, 11, closing the mold as shown in FIG. 18, and blowing a pressurized fluid into the parison 15 for blow molding, the pressed resin flows into the swelling forming part 14 so as to form the swelling part 9 on the welded surface 7 to be formed by being pressed by the top end surfaces of the recessed rib forming parts 13, 13.

Then, since the waste of the resin to the outer circumference of the welded surface 7 can be prevented according to the influx to the swelling part forming part 14 of the flowing resin pressed by the top end surfaces of the recessed rib forming parts 13, 13, the resin puddle is not generated on the outer circumference of the welded surface 7 so that the thickness irregularity is not generated in the welded surface 7 as well. By changing the position and the shape of the swelling part forming part 14 of the recessed rib forming parts 13, 13, the stepwise parts 17 shown in FIG. 10 can be formed.

By forming the swelling part 9 projecting stepwise from the welded surface toward the first wall 3 or the second wall 4, with the height thereof in a range of 0.5 to 6.0 mm in the recessed rib 20 axis direction, generation of the resin puddle, deformation, irregularity, or protrusion on the outer circumference of the bonding part can be prevented. Furthermore, by forming the hollow part 10 in the swelling part 9, the thickness of the welded surface 7 can be formed evenly so that an energy absorbing member having the stable energy absorbing property can be formed.

Figure 12:
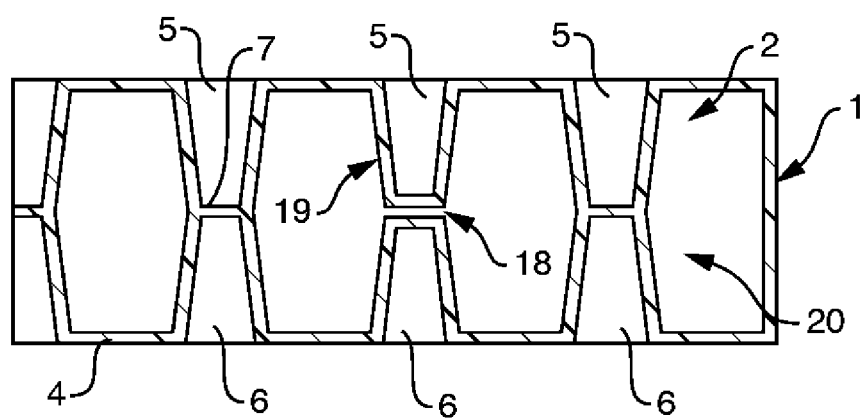
FIG. 12 is a cross-sectional view showing an energy absorbing member for a vehicle according to still another embodiment of the invention.
Figure 14:
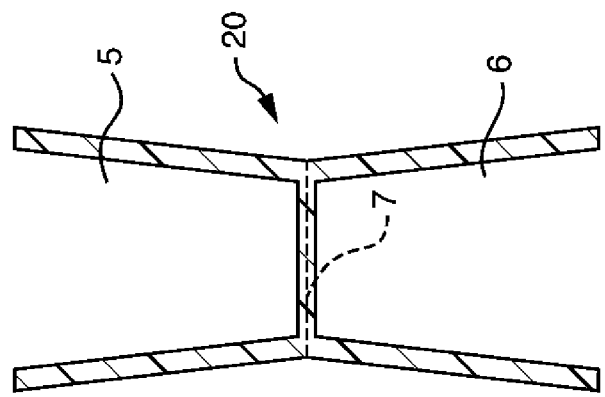
FIG. 14 is an enlarged view showing part of FIG. 12.
Figure 13:
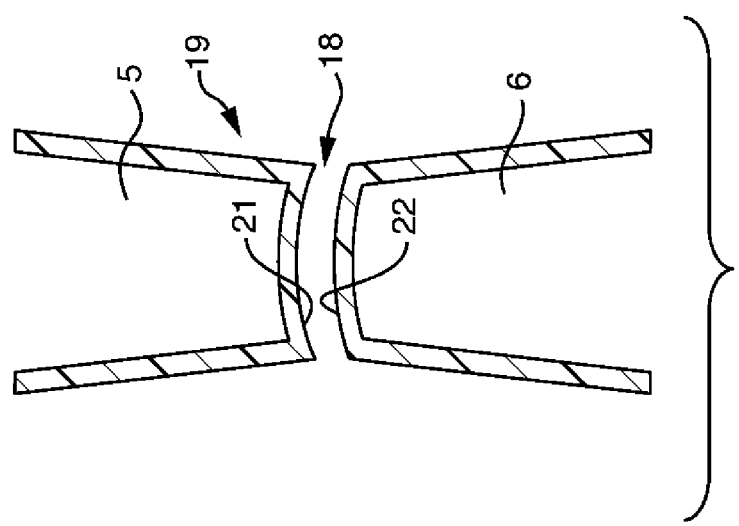
FIG. 13 is an enlarged view showing part of FIG. 12.

As shown in FIGS. 12 to 14, the energy absorbing member for a vehicle 1 according to the invention comprises at least one pair of recessed ribs 20 having a welded surface 7 with the top end parts of the first recessed rib 5 and the second recessed rib 6 welded and integrated, and at least one pair of recessed ribs 19 having an interval 18 of 5.0 to 18.0 mm on average with the top end parts of the one side recessed rib and the other side recessed rib facing each other.

According to one embodiment, the recessed ribs 20 that have a welded surface 7, the fused ribs, are about approximately 50 to 80% with respect to the total number of the recessed ribs. In such an embodiment, some ribs are configured such that the rib from the first wall is separated from its corresponding rib from the second wall by an interval. Such a configuration generally occurs in about approximately 50 to 20% of the ribs in a component. The facing interval of the top end parts of the recessed ribs 19 having the interval with the top end parts provided adjacently is according to various embodiments 5.0 to 18.0 mm on average. One skilled in the art will readily appreciate that such numbers are approximate, and the presence or absence of intervals would be dictated by the desired properties of the energy absorbing member and that various combinations of interval separated ribs and integral ribs would be within the scope of the present invention. Similarly, various dimensions for the intervals would be within the scope of the present invention.

According to the recessed ribs shown in FIGS. 12 and 13, one of the paired recessed ribs 19 having the interval 18 with the top end parts provided adjacently has the top end part formed as a concave surface part 21, and the other one has the top end part formed as a convex surface part 22, respectively. Then, by forming the top end parts accordingly, in the state with the recessed ribs 5, 6 deformed by receiving the impact so as to have the top end parts thereof contacted with each other, displacement with each other can be prevented so that the energy absorbing property of the energy absorbing member for a vehicle 1 can further be improved. The concave and convex surfaces of the recessed ribs 5, 6 may be provided in any mating fashion.

The energy absorbing member for a vehicle 1 according to the invention is blow molded as shown in FIGS. 15 and 16. The reference numerals 11, 11 are a pair of split mold halves. The split mold halves 11, 11 are provided with recessed rib forming parts 13, 13 for forming the recessed ribs 5, 6. The reference numeral 15 denotes a parison, and 16 an extrusion head.

The thermoplastic resin for providing the energy absorbing member for a vehicle 1 according to the invention, a resin having large mechanical strength and high degree of rigidity can be used. Examples thereof include, but are not limited to a polyolefin resin such as a high density polyethylene resin, a polypropylene resin, a polystyrene resin, an acrylonitrile-butadiene-styrene copolymer (ABS resin), an acrylonitrile-styrene resin (AS resin) and an acrylonitrile-acrylic rubber-styrene copolymer (AAS resin), a polyethylene terephthalate, a polycarbonate resin, a polyamide resin, a polyphenylene ether resin (PPO resin), a Polybutylene terephthalate and a blended composite thereof.

Figure 21:
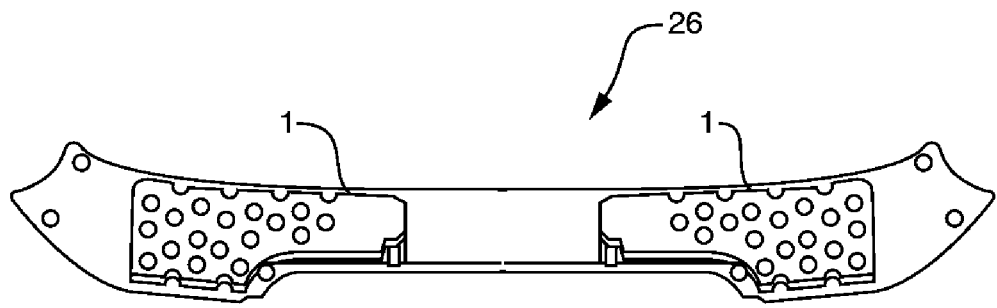
FIG. 21 is a rear view of a rear bumper with an energy absorbing member for a vehicle according to the invention provided therein.
Figure 22:
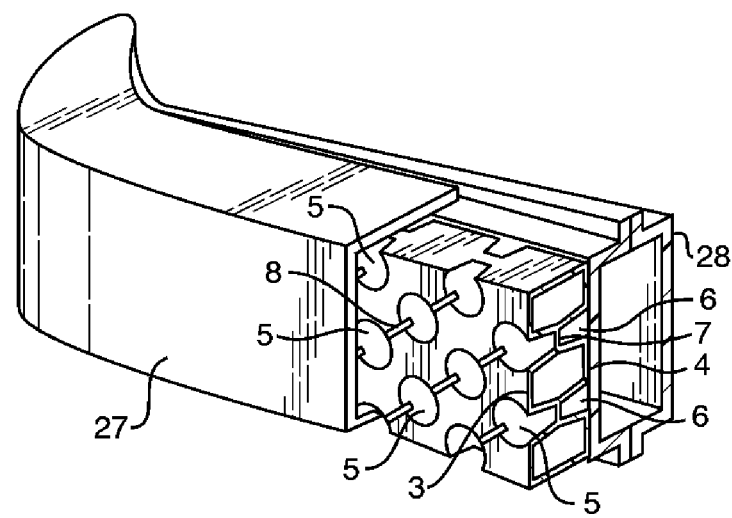
FIG. 22 is a view showing an energy absorbing member for a vehicle according to the invention provided between a bumper fascia and a bumper beam constituting a bumper.

The energy absorbing member for a vehicle 1 according to the invention is provided inside a vehicle structural member such as a door, a door trim, a body side panel, a roof panel, a pillar, a bumper, a seat, and an instrument panel an automobile, or the like. FIG. 19 shows an embodiment of providing the energy absorbing member for a vehicle 1 according to the invention inside a door trim 24 of a door 23, FIG. 20 shows an embodiment of providing the same inside a rear pillar 25 of an automobile, FIG. 21 shows an embodiment of providing the same inside a rear bumper 26, and FIG. 22 shows an embodiment of providing the same between a bumper fascia 27 and a bumper beam 28 of an automobile bumper. In FIG. 20, the mark A denotes the head of a passenger.

Figure 23:
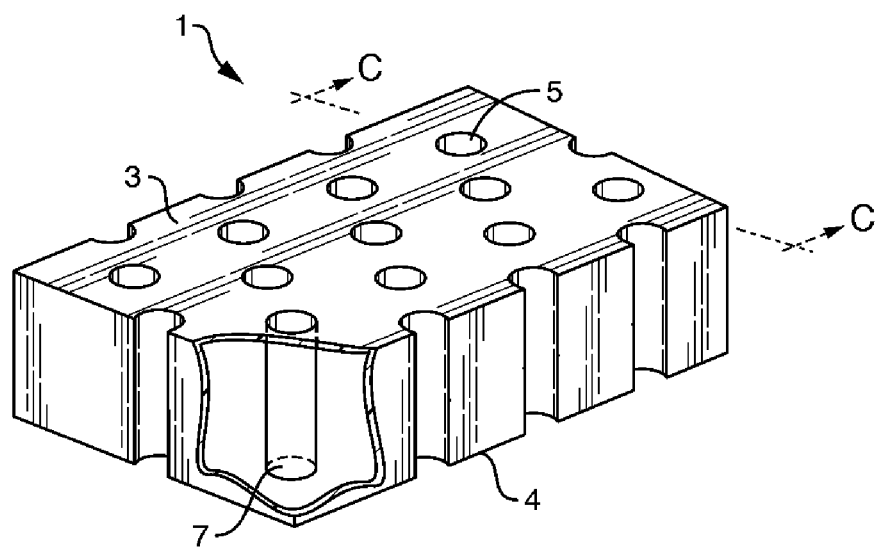
FIG. 23 is a view showing another embodiment of the invention.

FIG. 23 illustrates an energy absorbing member 1 according to one embodiment of the present invention which comprises the recessed rib 5 provided by denting the first wall 3 toward the facing second wall 4. The welded surface 7 with the top end part of the recessed rib and the second wall is welded and integrated such that the height of the recessed rib from the first wall 3 to the welded surface 7 is about approximately 15.0 to 45.0 mm. One skilled in the art will readily appreciate that such an embodiment is one possible variation of those embodiments described in detail above, and that the description of those embodiments would enable one of ordinary skill in the art to make or use the embodiment illustrated in FIG. 23 and various analogous embodiments, all of which are within the scope of the present invention. One of ordinary skill in the art will further appreciate that those variations of the paired rib embodiment described above are likewise applicable to the embodiment of FIG. 23 having a unitary rib.

Figure 24:
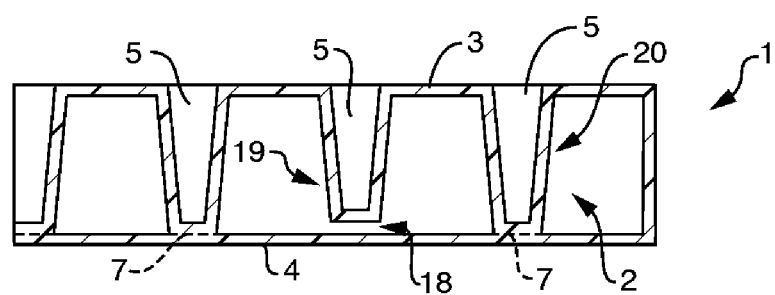
FIG. 24 is an enlarged cross-sectional view taken on the line C—C of FIG. 23.

FIG. 24 illustrates one embodiment of the present invention akin to that illustrated in FIG. 23 wherein the recessed ribs extend only from the first wall 3. The embodiment of FIG. 24 provides a gap or interval 18 between the second wall and the tip of the integral rib 5. One skilled in the art will readily appreciate that this embodiment is substantially similar to the embodiment illustrated in FIG. 12 and described in detail above, and that such an embodiment would be susceptible to the substantially the same configurations enabling absorption of impact energy as described herein.

As heretofore explained, the energy absorbing member for a vehicle according to the invention can be used preferably as a member for absorbing the impact of the collision, or the like by being disposed inside a vehicle structural member such as a door, a door trim, a body side panel, a roof panel, a pillar, a bumper, a seat, and an instrument panel of an automobile, or the like.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

We claim:

1. A system for absorbing an impact, said system comprising:
    a blow molded thermoplastic energy absorbing member comprising;
    opposing first and second walls defining a hollow space;
    a plurality of fused pairs of recessed ribs, each said fused pair comprising first and second recessed ribs;
    said first recessed rib is integrally molded from said first wall and having a first recessed rib end;
    said second recessed rib is integrally molded from said second wall and having a second recessed rib end;
    said first and second recessed ribs being integrally fused at a welded surface disposed between said first and second recessed rib ends, said first and second recessed ribs being symmetrically disposed upon either side of said welded surface; an average distance from said first wall to said welded surface is about approximately 15.0 to 45.0 mm;
    an average distance from said second wall to said welded surface is about approximately 15.0 to 45.0 mm;
    said hollow space having an average height between said first wall and said second wall of about approximately 30.0 to 90.0 mm;
    said first recessed rib and second recessed rib are constructed to be permanently crushed in the process of absorbing the impact energy; and
    a swelling part disposed in said first recessed rib end.

2. The system according to claim 1, wherein said swelling part is formed in a hollow shape.

3. The system according to claim 1, further comprising a stepwise part projecting from the welded surface.

4. The system according to claim 1, further comprising at least one unfused pair of recessed ribs having an interval disposed between said first and second recessed rib ends.

5. The system according to claim 4, wherein said fused pairs of recessed ribs comprise 50 to 80% of a total number of a sum of said fused and unfused pairs of recessed ribs.

6. The system according to claim 4, wherein said first unfused recessed rib end has a surface chosen from the group of surfaces consisting of a concave surface and a convex surface and said second unfused recessed rib end has a surface of the group not chosen by said first recessed rib.

7. The system according to claim 1, wherein said first recessed rib and said second recessed rib define openings having a diameter in the range of 15.0 to 30.0 mm and said welded surface with a diameter in the range of 5.0 to 15.0 mm.

8. The system according to claim 1, wherein said blow molded thermoplastic energy absorbing member is provided inside a vehicle structural member selected from the group consisting of door, door trim, body side panel, roof panel and pillar.

* * * * *